(12) United States Patent
Hentunen

(10) Patent No.: US 7,260,843 B2
(45) Date of Patent: Aug. 21, 2007

(54) INTRUSION DETECTION METHOD AND SYSTEM

(75) Inventor: Daavid Hentunen, Helsinki (FI)

(73) Assignee: Stonesoft Corporation, Helsinki (FI)

( * ) Notice: Subject to any disclaimer, the term of this patent is extended or adjusted under 35 U.S.C. 154(b) by 730 days.

(21) Appl. No.: 10/179,008

(22) Filed: Jun. 26, 2002

(65) Prior Publication Data

US 2003/0014664 A1    Jan. 16, 2003

(30) Foreign Application Priority Data

Jun. 29, 2001    (FI) ................................. 20011409

(51) Int. Cl.
   *G06F 11/00*    (2006.01)
   *G06F 9/00*    (2006.01)

(52) U.S. Cl. .......................................... 726/22; 726/11

(58) Field of Classification Search ................. 726/22, 726/23, 11; 713/154; 711/1
   See application file for complete search history.

(56) References Cited

U.S. PATENT DOCUMENTS

| 5,511,163 | A |   | 4/1996 | Lerche et al. |
| 5,949,973 | A | * | 9/1999 | Yarom ......................... 726/23 |
| 6,006,329 | A |   | 12/1999 | Chi |
| 6,219,706 | B1 |   | 4/2001 | Fan et al. |
| 6,301,699 | B1 | * | 10/2001 | Hollander et al. .......... 717/131 |
| 6,971,019 | B1 | * | 11/2005 | Nachenberg ................ 713/188 |
| 2001/0013094 | A1 | * | 8/2001 | Etoh et al. .................. 712/227 |

OTHER PUBLICATIONS

Von Helden et al., "Grundlagen, Forderungen und Marktubersicht fur Intrusion Detection Systeme (IDS) und Intrusion Response Systeme (IRS)," BSI-Studie—Onlilne!, paragraphs 2.2.4! 2.2.5!, (Sep. 2, 1999).
Highlander, H.J., "VChecker—A Virus Search Program," Computers & Security, Elsevier Science Publishers (Amsterdam, NL), vol. 8 (No. 8), p. 66-674, (Dec. 1, 1989).
IBM, "This Procedure Is Known as the Computer Virus Filter Procedure," Technical Disclosure Bulletin, IBM Corporation (New York), vol. 37 (No. 9), p. 691-692, (Sep. 1, 1994).
Graham, Robert, "Network Intrusion Detection Systems," FAQ-Online, Online, 7 pp., (Aug. 16, 2000).
DILDOG, "The Tao of Windows Buffer Overflow," Online, Cult of Dead Cow Paramedia, 15 pp., (Feb. 13, 1999).

* cited by examiner

*Primary Examiner*—Emmanuel L. Moise
*Assistant Examiner*—Ali S. Abyaneh
(74) *Attorney, Agent, or Firm*—Barnes & Thornburg LLP

(57) ABSTRACT

An intrusion detection system employs a pointer fingerprint method for detecting attempted or successful intrusions into an information system or network. In a pointer fingerprint method, the specific stream of bits searched from the traffic streams is a pointer or part of it that must be included in all working buffer overflow (bof) attacks. This makes it possible to detect also the previously unknown bof attacks.

11 Claims, 2 Drawing Sheets

INTRUSION DETECTION METHOD AND SYSTEM

FIELD OF THE INVENTION

The present invention relates to intrusion detection methods and systems.

BACKGROUND OF THE INVENTION

Intrusion detection systems (IDS) are systems that try to detect and alert on attempted or successful intrusions into an information system or network, where the intrusion is considered to be any unauthorized or unwanted activity on that system or network.

Buffer overflows (BOFs) in user input dependent buffers have become one of the biggest security hazards on the Internet and to modern computing in general. This is because such an error can easily be made at programming level, and while invisible for the user who does not understand or cannot acquire the source code, many of those errors are easy to exploit.

The principle of exploiting a buffer overflow is to overwrite parts of memory, which aren't supposed to be overwritten by arbitrary input, and making the process execute this code. To see how and where an overflow takes place, lets take a look at how memory is organized.

In the following one type of a BOF attack is explained in more detail. It should be appreciated that this is only an example and the details of the attack may vary from one attack to another. For example, the pointer may be some other pointer than a pointer to stack address space. (Below a term stack pointer is used for referring to a pointer to stack address space.) Memory addresses can be physical addresses of the memory or virtual/logical addresses used by processes running in a computer. A page is a part of memory that uses its own relative addressing, meaning the kernel allocates initial memory for the process, which it can then access without having to know where the memory is physically located in RAM. The processes' memory consists of three sections: The address space of processes is divided into at least three regions: Code, Data, and Stack. Data in the code segment are machine instructions that the processor executes. The code execution is non-linear, it can skip code, jump, and call functions on certain conditions. Therefore, we have a pointer called EIP, or instruction pointer. The address where EIP points to always contains the code that will be executed next. The data region is a memory space for variables and dynamic buffers. Static variables are stored in this region. The stack is a contiguous block of memory containing data and possibly also some executable code. The bottom of the stack is at a fixed address and fixed size of memory is allocated for the stack. How much of this memory space is used, is dynamically adjusted by the kernel at run time. Depending on the implementation the stack will either grow down (towards lower memory addresses), or up. The stack has the property that the last object placed on the stack will be the first object removed. This property is commonly referred to as last in, first out queue, or a LIFO. The stack consists of logical stack frames that are pushed when calling a function and popped when returning. A stack frame contains the parameters to a function, its local variables, and the data necessary to recover the previous stack frame, including the value of the instruction pointer at the time of the function call address after the stack. The CPU implements instructions to PUSH onto and POP off of the stack. PUSH adds an element at the top of the stack. POP, in contrast, reduces the stack size by one by removing the last element at the top of the stack. A register called the stack pointer (SP) points to the top of the stack. The stack pointer (SP) is also implementation dependent. It may point to the last address on the stack, or to the next free available address after the stack.

A buffer is simply a contiguous block of computer memory that holds multiple instances of the same data type. A buffer overflow is the result of stuffing more data into a buffer than it can handle, i.e. to overflow is to flow, or fill over the top, brims, or bounds. Buffer overflow (bof) is also a term used for a programming error that enables miss-use of a program in such a way that program overwrites some data in the memory. Buffer overflow attack (bof-attack) is a way to exploit bof-weakness in program to execute arbitrary code or to alter the control flow in a malicious manner in a target system where the code is running.

Shell code is simply machine instructions, which we write on the stack and then change the return address to return to the stack. Using this method, a code can be introduced into a vulnerable process and then execute it right on the stack. The return address can be changed to point to a shell code put on the stack by, for example, adding some NOP (no operation) instructions before the stack. As a result it is not necessary to be 100% correct regarding the prediction of the exact start of our shell code in memory (or even brute forcing it). The function will return onto the stack somewhere before our shell code and work its way through the NOPs to our new return address and run our code on the stack.

General fingerprinting is used in most of intrusion systems that use fingerprinting as one of their intrusion detection methods. It is usually a simple pattern matching which searches for some piece of publicly known attack (piece of shell code or whole attack code). There are some weaknesses in these prior art IDS methods. Firstly, because it is possible to write bof-attack (shell code- and nop-part of bof-attack) for exploitable service in many ways (bof-attacks do not resemble each other), general fingerprinting is not sufficient method for detecting bof-attacks. Secondly, it is a heavy operation to process huge amount of data to be analysed because of the large size of the fingerprint. In the prior art methods a bit sequence in data packet has been compared to a high number of long fingerprint patterns. On the other hand, due to the long fingerprint patterns, there have typically not been needs for comparing the fingerprints to "many points" in the bit stream in the data packet. However, since the number of the different fingerprints to be checked is very high (equal to different known attack types), much processing capacity is used. So there is need for a better technique to find both publicly known and yet unknown bof-attacks in a TCP stream.

DISCLOSURE OF THE INVENTION

An object of the invention is new intrusion detection, which is effective for detecting bof-attacks.

This object of the invention is achieved according to the invention as disclosed in the attached independent claims. Preferred embodiments of the invention are disclosed in the dependent claims.

The basic idea of the present invention is to search for a specific stream of bits that must be included in all working general bof-attacks. General bof-attack can be written so that the nop (no operation) part is left out and only return address is included after the shell code part. Also a shell code part can be written in a plurality of different ways. Only thing that must remain same from one bof attack to another is a small part of return address. Thus, the specific stream of bits searched in the present invention is a specific return address or part of it, i.e. pointer or part of it. This is called a pointer fingerprint herein. The pointer fingerprint may also include, in addition to the relevant pointer, a number of extra/stuff bits having no significance in the searching process. The pointer fingerprint data that is searched is shorter than the prior art fingerprints, for example about 8 to 12 bits long. This has the disadvantage that one pointer fingerprint must be compared with several points in the bit stream within a data packet. On the other hand, the number of pointer fingerprint patterns can be significantly lower, for example one per each operating system, than in the prior art methods. This means that it is cost efficient to search for the fingerprint from data to be analysed. Further and more significantly, as the pointer fingerprint must be present in most of the bof attacks, it can be used for detecting also unknown attacks. In the prior art methods it is necessary to first observe a new attack before it has been possible to define a fingerprint for it.

The invention can be used for any kind of pointers. The general bof attacks use stack pointers. More advanced bof attacks, such as heap overflows and one-byte overflows, use e.g. library of c (libc) function pointers and pointers to a Global Offset Table (GOT). Also other pointers may be used in bof attacks. Thus, the pointers to be searched may optionally or alternatively include also some libc function pointers and pointers to GOT. It should be appreciated that pointers vary between different operating systems and processors.

The pointer fingerprints according to the invention can be searched for in any data format; the data can be for example binary or hexadecimal code or it can be in coded format, such as in UTF-8 coded format. A fingerprint in multiple parallel formats can be used in the analysis concurrently.

The pointer fingerprint(s) may be searched from all traffic. In the preferred embodiment of the invention only specific types of packets or data streams according a specific protocol(s) are monitored for the pointer fingerprints. Such data packets or data streams are preferably selected so that they do not normally contain pointers. If a pointer fingerprint is found in such data packet or data stream, it can be assumed there is a bof attack. There may be means for detecting which data packets or data streams should not contain the pointers, and the search is carried out in these detected packets or streams.

In a further embodiment of the invention the parts of the traffic, which are not in accordance with a specific protocol used, are first recognized, and thereafter the pointer fingerprint method is used for detecting a bof attack in these recognized parts.

In a still further embodiment of the invention the pointer fingerprint(s) may be searched from all traffic, and if a pointer fingerprint is found, then it is analyzed whether the presence of a pointer in the specific point in the traffic is allowed or not. If the presence of the pointer is not allowed, a bof attack is assumed to be detected.

The pointer fingerprint method according to the invention is most preferably employed with other IDS methods in order to achieve best possible detection.

BRIEF DESCRIPTION OF THE DRAWINGS

Embodiments of the invention will be described with reference to attached drawings, in which.

DETAILED DESCRIPTION OF THE INVENTION

Figure 1:
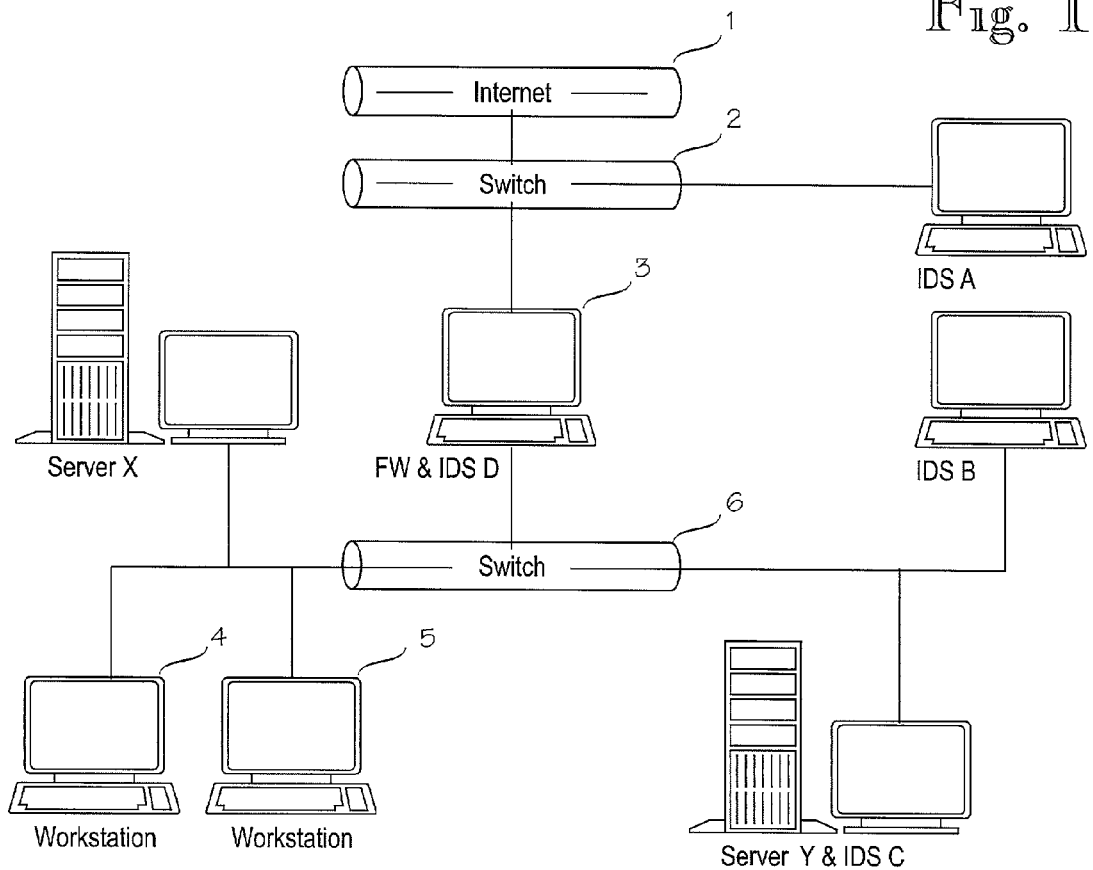
FIG. 1 illustrates a network in which the present invention can be applied.

The intrusion detection system (IDS) and method according to the present invention can be applied in any network element. Physically such a network element is machine with appropriate software to do the tasks assigned to it. It can be a router, a personal computer (PC), a server, or whatever what can be used for such purposes. Attacks can be searched for from traffic in many points in a data system or network. The selection of the location of the IDS in a network may be based on, for example, the processing capacity of the available network devices in relation to the amount of the network traffic, or a desire to examine only a specific traffic, e.g. traffic in the Intranet. In FIG. 1, some possible locations in a information network for a network device IDS X which perform a pointer finger print analysis according to the present invention (or generally any fingerprint analysis) are shown.

A local area network LAN (such as Intranet) of a company is connected via a firewall 3 and switch 2 to Internet 1. The LAN includes servers X and Y, and workstations 4 and 5. The traffic within the LAN is switched by switch 6. It should be appreciated that this network architecture is presented only to illustrate how the IDS can be situated in a data network. A network architecture used is not relevant to the present invention, and the invention is not intended to be restricted into any specific type of network or network architecture.

Intrusion detection system IDS A is located at a "port monitor" port of a switch 2, which is outside the firewall 3 of the company. From the port monitor port it is possible to monitor the traffic passing through the switch 2. At that location of IDS A it is possible to examine or detect, for example, such attacks towards the company whose propagation is normally blocked at the firewall 3. The disadvantage of this location is, at least, the high amount of traffic. The consequence of this is normally that all traffic cannot be analyzed without a special arrangement. This kind of special arrangement is for example an arrangement in which a plurality of parallel computers or devices are combined with some special load balancing solution. The advantage is that, if the processing capacity is sufficient, we are able to observe even all the attempted attacks towards the company network, which did not pass through the firewall 3 to the internal data network.

The intrusion detection system IDS B is located to the company network inside the firewall. More particularly, IDS B is located at a port monitor port of switch 6. Thus, the IDS B analyzes only the traffic within the company network and the traffic outgoing from the company network but is it not able to monitor the traffic which has not passed through the firewall. At this location, we have more information about the nature of the traffic, and therefore it is easier to restrict the analyses into a specific type of traffic.

The intrusion detection system IDS C is located at the server Y. At that location, the IDS C is operating between the server Y and the remaining company network, and it is able to monitor only the traffic to and from the server Y.

The intrusion detection system IDS D is located at the firewall 3. At that location, the IDS D carries out the analyses within the firewall 3 to the traffic passing through the firewall 3.

Additionally, an IDS system may also reside in the end user's workstation 4 or 5 and analyse traffic of that particular workstation (host based IDS).

According to the present invention, the attacks are detected by searching pointer fingerprints, i.e. pointers or part of them. Pointers that we are interested in are stack pointers, some libc-function pointers and pointers to GOT. All of these vary between different operating systems and processors.

General buffer overflow (bof) attacks use stack pointers. More advanced attacks use e.g. heap overflows or one-byte overflows. Also libc-functions and GOT can be exploited. Libc-function addresses and GOT pointers are constant (but vary between different library versions, operating system and processors) so that all 32 bits thereof can be fingerprinted from network streams.

Typical base stack addresses for some operating system (kernels) are (depending e.g. on the actual compilation of the operating system also others may exist):

| | |
|---|---|
| Solaris 2.6 (Intel) | 0xEF FF FF FF |
| Redhat Linux 6.x (Intel) | 0xBF FF FF FF |
| Solaris 7.0 (Intel) | 0xFF BE FF FF |
| OpenBSD 2.5 (Intel) | 0xEF BF FF FF |
| FreeBSD 3.2 (Intel) | 0xBF BF FF FF |

The IDS system according to the present invention monitors the traffic streams and search for pointer fingerprints, i.e. specific pointers or predefined parts of such pointers. The fingerprint to be search for may be a constant part of a stack pointer which part is present in all operating stack pointers. The constant part can be determined on the basis of the start address of the stack. Let us now examine an example of calculating constant stack fingerprint.

Let us assume that programs do not usually allocate more than 2 megabytes for local variable. Let us also assume that environment variables do not take too much stack space (<60 Kb). Summing these two factors, we get the maximum (the worst case) stack space allocated for current user process. Then, we can calculate constant part of base stack address in following way (assuming that $2^{21}$+60Kb is approximately $2^{21}$): Firstly, the stack allocated to the local variables is 2 megabytes which means $2^{21}$ in binary, and 0x0001FFFFF in hexadecimal numbers.

This further means that 21 least significant bits can vary from pointer to pointer. Therefore, if a pointer is 32 bits long, most significant 11 bits (32−21=11 bits) are constant in all valid stack pointers that the program uses.

For example, the constant part of the stack pointer for the Linux kernel can be calculated by subtracting the local variables address space 0x0001FFFFF from the base stack address of Linux 0xBFFFFFFF. In other words, the constant part for the example Linux kernel is Base stack address=0xBFFFFFFF=in binary 10111111 11111111 11111111 11111111.

Local variables −0x001FFFFF=in binary 00000000 00011111 11111111 11111111.

Constant part=0xBFE00000=in binary <u>10111111111</u>00000 00000000 00000000.

As an example of possible fingerprints, 11-bit fingerprint masks for above addresses (padded so that number of bits in fingerprint is divisible by 8) are

| | |
|---|---|
| Solaris 2.6 (Intel) | 0xEF E0 |
| Redhat Linux 6.x (Intel) | 0xBF E0 |
| Solaris 7.0 (Intel) | 0xFF A0 |
| OpenBSD 2.5 (Intel) | 0xEF A0 |
| FreeBSD 3.2 (Intel) | 0xBF A0 |

Examples of Code Segments addresses for which it is also possible to calculate a fingerprint are:

| | |
|---|---|
| RedHat 6.x (Intel) | 0x08 00 00 00 |
| Debian Linux 2.4 (Intel) | 0x08 00 00 00 |
| Digital Unix 4.0 D(Alpha) | 0x00 00 00 01 20 ?? ?? ?? |

For example following fingerprints can be used for detecting exploits of above code segment addresses:

| | |
|---|---|
| RedHat 6.x (Intel) | 0x08 00 |
| Debian Linux 2.4 (Intel) | 0x08 00 |
| Digital Unix 4.0 D(Alpha) | 0x01 20 |

When searching for positive identification of attack with above fingerprints, we should remember only to compare/mask first 11 bits of fingerprint with data we are inspecting, not whole 2 bytes. That is, the last 5 bits of the fingerprint's bit pattern are not considered, when comparing the fingerprint to the traffic flow.

It should be appreciated that also less than 11 bits can be used, for example, 8 to 11 bits may be suitable. The invention is not restricted to any specific stack fingerprint. In the present invention the stack fingerprinting means any pattern matching that searches for a piece of platform and processor dependent stack start address bits that must be included in all general buffer overflow attacks.

The IDS system A, B, C, and D monitors the traffic and searches for pointer fingerprints, i.e. predefined pointers or predefined parts of the pointers, from the data stream. The traffic to be monitored depends on the details in each specific application; it is possible to monitor all the traffic or only specific type of packets or data streams according to a specific protocol, etc. If the pointer fingerprint is found in such part of the data stream where it should not be in a normal (legal) traffic, it can be assumed that there is a bof attack. Thus, in order to be able to recognize actual attacks the IDS system must somehow know the parts of the data stream in which the presence of the stack pointers is allowed.

Figure 2:
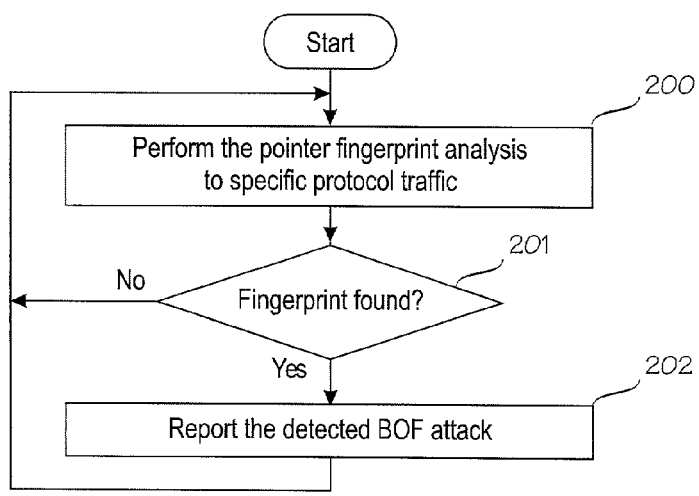
FIGS. 2, 3 and 4 are flow diagrams illustrating different embodiments of the invention.

Therefore, in the preferred embodiment of the invention pointer fingerprints are searched for primarily in traffic according to a specific protocol since legal protocol traffic should not contain stack pointers, as illustrated by steps 200, 201 and 202 in the flow diagram shown in FIG. 2. For example, in the FTP protocol the pointer fingerprint technique according to the present invention is preferably applied to a control connection but not to the data connection, since the data connection traffic may contain legal stack pointers. The simplest way to distinguish the FTP data connection from the FTP control connection is the port field in the data packets. The FTP control connection is typically addressed to port 21 and the data connection to port 20.

Similarly, the method according to the invention is not preferably used for examining the content of an electronic mail in the SMTP protocol. By monitoring the traffic according to the SMTP protocol it is possible to recognize the part of the traffic, which are transferring E-mail content.

If the traffic according to the protocol contains only "human perceivable data", in other words alphanumeric symbols, which are additionally in US-ASCII format (7 bits per character), the pointer fingerprint may shrink to have a length of one bit. This is due to the fact that because the alphanumeric symbols are 7 bit symbols every 8 bit in the data stream should be 0, if the traffic is legal traffic. If every 8 bit is not 0 in the traffic stream, it can be assumed that the stack pointer and possible a bof attack is found, since the highest bit is typically 1 in the stack pointers.

Figure 3:
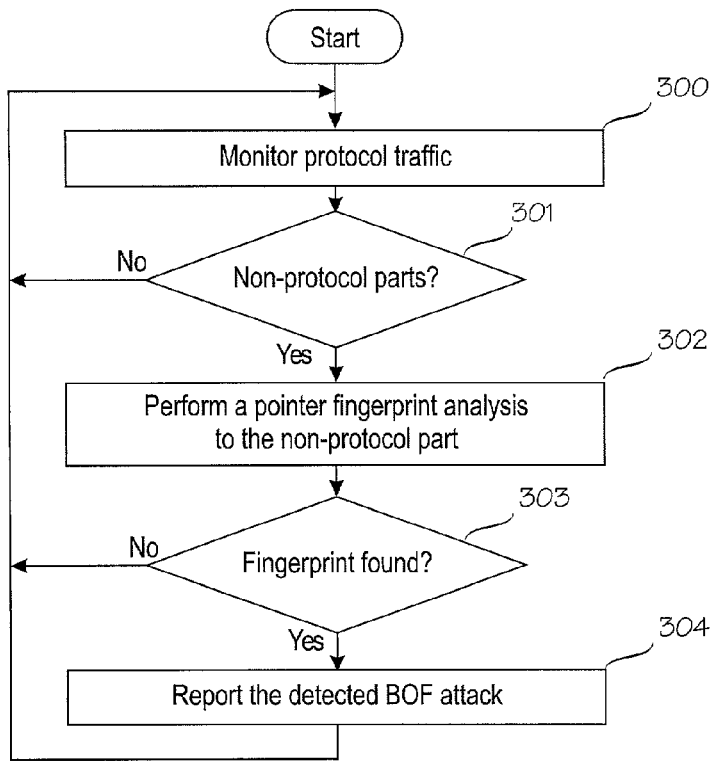

In another embodiment of the invention the parts of the traffic, which are not in accordance with a specific protocol used, are first recognized, and thereafter the pointer fingerprint method is used for detecting a bof attack in these recognized parts. It is also possible to recognize abnormal use of commands in accordance with a specific protocol and use pointer fingerprint method for detecting a bof attack in the parts of traffic where such abnormal use is recognized. For example, multiple consecutive authentication requests can be considered abnormal, since usually one successful authentication should be sufficient. This embodiment is illustrated by steps 300, 301, 302, 303 and 304 in the flow diagram shown in FIG. 3.

Figure 4:
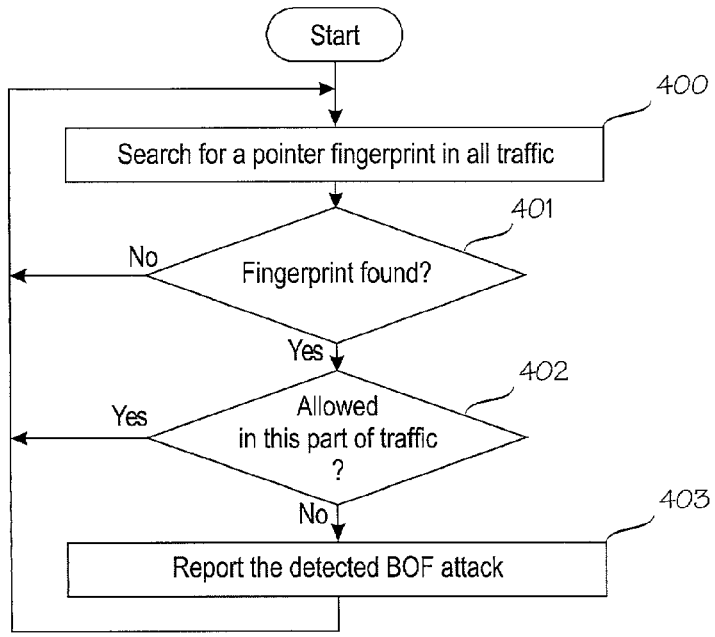

In a still further embodiment of the invention the pointer fingerprint(s) may be searched for from all traffic and if the pointer fingerprint is found, it is then analyzed whether the presence of a pointer in the specific point in the traffic is allowed or not. If the presence of the pointer is not allowed, a bof attack is assumed to be detected. For example, if the traffic is FTP traffic, the pointer fingerprint may be first searched for in all traffic, and when a pointer fingerprint is found in the traffic, it is then analyzed whether the specific part of the traffic is a control connection or a data connection. If the specific part of the traffic is a control connection, an attack is detected, and if the specific part is a data connection, the pointer is considered to a part of valid traffic and no attack is assumed to be present. This embodiment is illustrated by steps 400, 401, 402 and 403 in a flow diagram shown in FIG. 4.

The IDS according to the present invention typically only registers the detected bof attack and issues an alarm to a system operator. In other words, the present invention is primarily intended to detect the attacks and to report the detected attacks to some other instance, as illustrated by steps 202, 304 and 403 in FIGS. 2, 3 and 4, respectively.

The operation of the intrusion detection system according to the present invention is now illustrated by means of an example. Referring to FIG. 1, the intrusion detection system B has knowledge of the traffic profile in the internal company network, i.e. the IDS B knows what traffic and to which destination is allowed in the company network. Let us further assume that the network traffic to be monitored is restricted to traffic to and from a specific server, such as server X in FIG. 1. We also assume that the server X to be monitored provides FPT, E-mail (such as SMTP), and DNS (domain name service) services.

IDS B has knowledge of the specific protocols FTP, SMTP and DNS. The knowledge of the protocols enables that the IDS B can perform the pointer fingerprint analyses to the protocol itself instead of performing the analyses to the possibly arbitrary data carried within the protocol (e.g. the content of the E-mail, or a data stream of a file transferred by the FTP), and thereby a high number of unnecessary alarms can be avoided.

As a consequence, we know the bit patterns allowed in the protocols and the bit patterns of the pointer fingerprints. In those cases these two patterns should not be equal to each other in any legal situation, a pointer fingerprint analysis is carried out for the specific part of traffic. If the analyses indicate that the bit pattern of the pointer fingerprint matches with a bit pattern in the traffic, we have detected traffic, which is not in accordance with the protocol and thereby possibly an attempted bof attack. On the other hand, if we detect traffic which is not in accordance to the protocol but we cannot find a bit pattern of the pointer fingerprint from the traffic in question, we can be quite sure that no bof attack has been made in this case (at least not successfully).

The following listing illustrates a normal connection of the FTP protocol from the start to the authentication:
S: "220 xyz.abc.com FTP server (Version x.x) ready.
U: "USER mike"
S: "331 Password required for mike."
U: "PASS secret"
S: "230 Login mike ok."
U: . . .
S: . . .

In this case, based on its knowledge of the FTP protocol, the IDS B would be able to expect that after "user<user name>" commands a password command "PASS<password> follows in accordance with the protocol. However, if the IDS B finds something else in place of the password command, and this something else would appear to be matching with some of the pointer fingerprint patterns known by the IDS B, a bof attack is probably detected.

In the following, an example of a possible attack in the above-described part of the FTP protocol is illustrated. A stack pointer fingerprint for a specific Linux operating system in an Intel processor is 0xbfe. Then, a FTP protocol traffic including an attack could read:
S: "220 xyz.abc.com FTP server (Version x.x) ready.
U: "USER mike"
S: "331 Password required for mike."
U: . . . "\xBF\xEF\xCO\x23" . . .
S: . . .

It can be seen that a pointer fingerprint can be found in the protocol traffic subsequent to the password command, i.e. in a place no stack pointer should normally be present. Therefore, when a pointer fingerprint 0xBFE is detected in this part of the protocol, it can be assumed that a bof attack has been attempted.

It will be apparent for those skilled in the art that the illustrative embodiments described are only examples and that various modifications can be made within the scope and spirit of the invention as defined in the appended claims.

The invention claimed is:

1. A method of detecting intrusions to a data system, said method comprising:
   searching for at least one predefined pattern in a traffic stream, said predefined pattern being part of at least one pointer,
   detecting a potential attack, if said at least one predefined pattern is found in the traffic stream,
   said at least one predefined pattern comprising a predetermined stream of bits from a return address space of an operating system buffer to detect a buffer overflow attack against said operating system buffer.

2. A method according to claim 1, wherein said at least one pointer comprises a stack pointer.

3. A method according to claim 1, wherein said at least one pointer comprises a library of c (libc) function pointer or a pointer to a Global Offset Table (GOT).

4. A method according to claim 1, 2 or 3, comprising
determining parts of said traffic which are not in accordance with a specific protocol used
searching for said at least part of said at least one pointer in said determined part of said traffic.

5. A method according to claim 1, 2 or 3, comprising searching for said part of said at least one pointer only in specific types of data packets or data streams according to a specific protocol which do not contain pointers in accordance with the specific protocol.

6. A method according to claim 1, 2 or 3, comprising
searching for said part of said at least one pointer in all traffic,
if a pointer fingerprint is found, analyzing whether the presence of a pointer in the specific point in the traffic is allowed or not, and
if the presence of the pointer is not allowed, an attack is assumed to be detected.

7. A method of detecting intrusion to a data system, said method comprising:
searching for part of at least one stack pointer in a traffic stream,
detecting a potential attack, if said part of said at least one stack pointer is found in the traffic stream,
said part of at least one stack pointer comprising a predetermined stream of bits from a return address space of an operating system buffer to detect a buffer overflow attack against said operating system buffer.

8. A computer-readable medium, containing a computer software which causes the computer to execute a process comprising:
searching for at least one predefined pattern in a traffic stream, said predefined pattern being part of at lest one pointer,
detecting a potential attack, if said at least one predefined pattern is found in the traffic stream,
said at least one predefined pattern comprising a predetermined stream of bits from a return address space of an operating system buffer to detect a buffer overflow attack against said operating system buffer.

9. A computer-readable medium, containing a computer software which causes the computer to execute a process comprising;
searching for part of at least one stack pointer in a traffic stream,
detecting a potential attack, if said part of said at least one stack pointer is found in the traffic stream,
said part of at least one stack pointer comprising a predetermined stream of bits from a return address space of an operating system buffer to detect a buffer overflow attack against said operating system buffer.

10. An intrusion detection system, said system comprising:
means for searching for at least one predefined pattern in a traffic stream,
means for detecting a potential attack, if said at least one predefined pattern is found in the traffic stream,
wherein said at least one predefined pattern is part of at least one pointer,
said at least one predefined pattern comprising a predetermined stream of bits from a return address space of an operating system buffer to detect a buffer overflow attack against said operating system buffer.

11. An intrusion detection system, said system comprising:
means for searching for at least one predefined pattern in a traffic stream,
means for detecting a potential attack, if said at least one predefined pattern is found in the traffic stream,
wherein said at least one predefined pattern is part of at least one stack pointer, and said at least one predefined pattern comprises a predetermined stream of bits from a return address space of an operating system buffer to detect a buffer overflow attack against said operating system buffer.

* * * * *